(12) United States Patent
Ferreira

(10) Patent No.: US 9,759,541 B2
(45) Date of Patent: Sep. 12, 2017

(54) DEVICE FOR MEASURING DEFORMATIONS ON SURFACES

(71) Applicant: EMBRAER S.A., São José dos Campos-SP (BR)

(72) Inventor: Flávio César Ferreira, São José dos Campos (BR)

(73) Assignee: EMBRAER S.A., São José dos Campos-SP (BR)

( * ) Notice: Subject to any disclaimer, the term of this patent is extended or adjusted under 35 U.S.C. 154(b) by 161 days.

(21) Appl. No.: 14/651,986

(22) PCT Filed: Dec. 3, 2013

(86) PCT No.: PCT/BR2013/000540
§ 371 (c)(1),
(2) Date: Jun. 12, 2015

(87) PCT Pub. No.: WO2014/089653
PCT Pub. Date: Jun. 19, 2014

(65) Prior Publication Data
US 2015/0330759 A1    Nov. 19, 2015

(30) Foreign Application Priority Data

Dec. 14, 2012  (BR) .............................. 102012031975

(51) Int. Cl.
*G01B 5/20*    (2006.01)
*G01B 5/30*    (2006.01)
*G01B 5/00*    (2006.01)
*G01B 21/20*   (2006.01)

(52) U.S. Cl.
CPC ............. *G01B 5/30* (2013.01); *G01B 5/0009* (2013.01); *G01B 5/0025* (2013.01); *G01B 5/20* (2013.01); *G01B 21/20* (2013.01)

(58) Field of Classification Search
CPC ................................... G01B 5/20; G01B 5/26
USPC ..................................................... 33/533, 122
See application file for complete search history.

(56) References Cited

U.S. PATENT DOCUMENTS

| 3,639,993 A |   | 2/1972  | Sartorio |            |
|-------------|---|---------|----------|------------|
| 4,416,064 A | * | 11/1983 | Hurst    | G01B 5/0025 |
|             |   |         |          | 33/501     |
| 4,477,978 A | * | 10/1984 | Azuma    | G01B 7/002 |
|             |   |         |          | 33/1 M     |

(Continued)

FOREIGN PATENT DOCUMENTS

JP    52-140356    11/1977

OTHER PUBLICATIONS

International Search Report for PCT/BR2013/000540 mailed Feb. 14, 2014, 3 pages.

*Primary Examiner* — Christopher Fulton
(74) *Attorney, Agent, or Firm* — Nixon & Vanderhye P.C.

(57) ABSTRACT

There is described a device for measuring deformations (10) on surfaces endowed with a frame (11) associated to fastening means (20) of the device (10) on the surfaces, the device (10) further comprising, at least a pair of guides (31, 32) associated longitudinally to an inner portion (12) of the frame (11) and spaced apart parallel to each other, and a sliding support (40) perpendicularly associated to the guides (31, 32); the sliding support (40) comprising a transversal groove (41) on which there is disposed a mobile base (42) that receives a measuring element (50).

9 Claims, 1 Drawing Sheet

(56) References Cited

U.S. PATENT DOCUMENTS

| | | | | |
|---|---|---|---|---|
| 4,507,872 A | * | 4/1985 | Schermann | G01B 5/0025 33/546 |
| 4,995,277 A | * | 2/1991 | Yanagisawa | B23Q 1/4809 248/657 |
| 5,051,933 A | | 9/1991 | Sarr et al. | |
| 5,105,552 A | * | 4/1992 | Bielle | G01B 5/0011 33/1 M |
| 5,205,046 A | * | 4/1993 | Barnett | G01B 5/285 33/533 |
| 5,471,762 A | * | 12/1995 | Miller | G01B 5/28 33/533 |
| 6,148,532 A | * | 11/2000 | Ellis | G01B 5/285 33/533 |
| 7,345,773 B2 | * | 3/2008 | Yano | G01B 11/306 33/533 |
| 7,730,622 B2 | * | 6/2010 | McCauley | E04B 9/00 33/194 |
| 7,743,525 B2 | * | 6/2010 | Zhang | G01B 5/20 33/533 |
| 8,127,457 B2 | * | 3/2012 | Stoklosa | B25H 7/04 33/32.2 |
| 8,322,044 B2 | * | 12/2012 | Gregory | G01B 3/28 33/836 |
| 2002/0083607 A1 | | 7/2002 | Atsuhiko et al. | |
| 2003/0206304 A1 | | 11/2003 | Davis et al. | |

\* cited by examiner

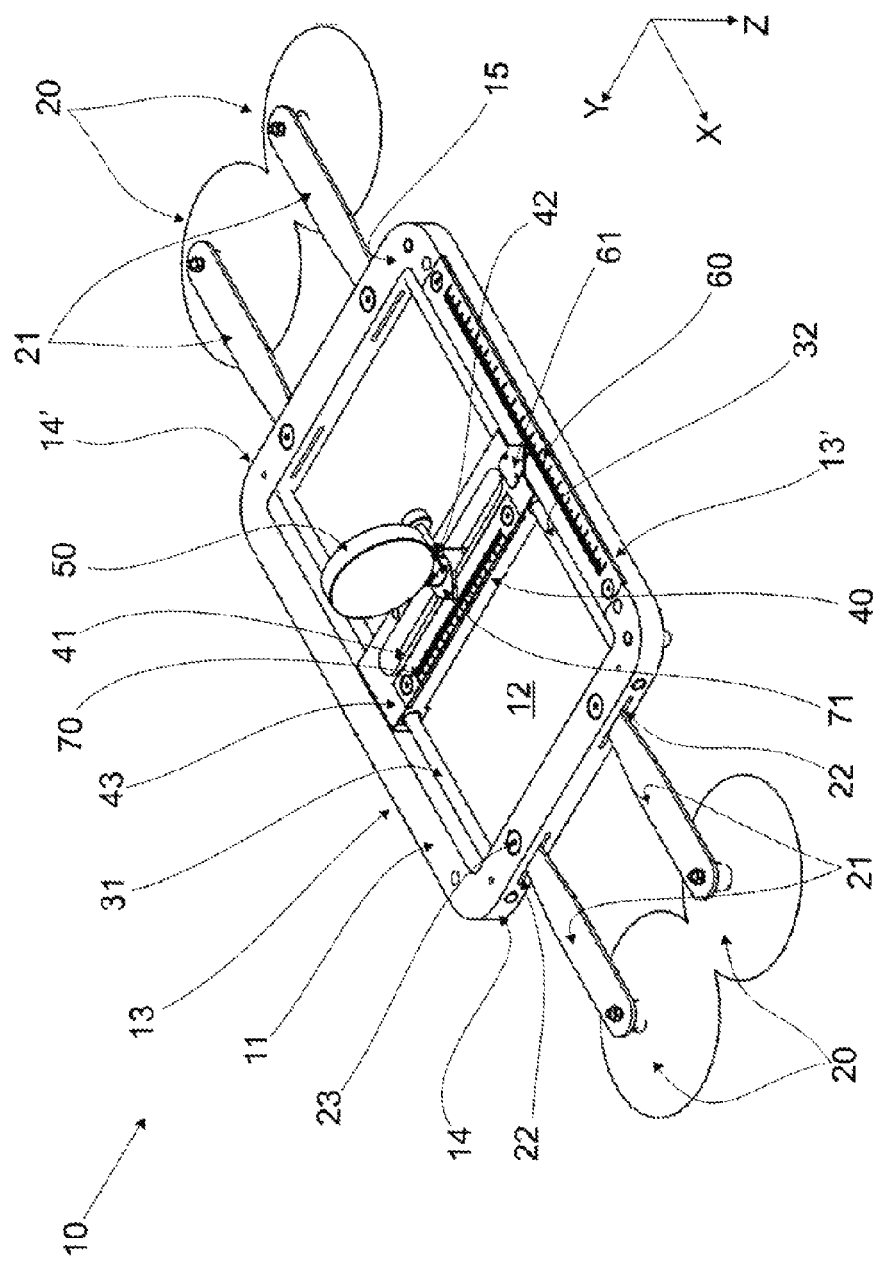

DEVICE FOR MEASURING DEFORMATIONS ON SURFACES

This application is the U.S. national phase of International Application No. PCT/BR2013/000540 filed 3 Dec. 2013 which designated the U.S. and claims priority to BR Patent Application No. 102012031975-6 filed 14 Dec. 2012, the entire contents of each of which are hereby incorporated by reference.

The present invention refers to a device for measuring deformations such as depressions, dents, folds on any surface and for various types of application.

DESCRIPTION OF THE PRIOR ART

Devices for measuring deformations are widely used in industries, mainly the automotive vehicles and aircraft industries. These devices are used for measuring deformations found on various surfaces, made of metal or of any other types of materials.

Measuring these deformations is necessary both for aesthetic and performance reasons. In an aircraft, for example, it is desirable to know the deformation of a certain area so that it is analyzed in order to not affect the performance of the aircraft. Even if a deformation is minor, it may aerodynamically influence and generate undesirable drag, consequently interfering with the performance of the, aircraft.

Additionally, the performance of high-speed automotive vehicles may also be adversely affected due to minor deformations in their structures.

Therefore, over time the measuring of depression, dent, deformation and folds in structures came to be performed with a millimeter rules, caliper gauge and feeler gauge. However, it is noted that this equipment did not offer accuracy and repetitively of the data found on measuring a same flaw and, moreover, require the participation of at least two persons to perform the task.

With the objective of remedying this shortcoming in accuracy and repetitively, some deformation measuring devices have been developed. However, the devices currently used in industry to measure deformations are relatively expensive, complex to operate, heavy and there are physical restrictions in their use.

An example of these devices known in the prior art is described and illustrated by document U.S. Pat. No. 5,051,933. This document refers to a waviness measurer of aerodynamic surfaces of an aircraft, the measurer being endowed with a sensing unit and a processing unit. The sensing unit, which is positioned on the surface to be measured, comprises a structure on which a mobile element is mounted so as to slide linearly over this structure. This mobile element contains a first sensor that collect deflections on the vertical axis of the equipment (axis Z) and a second sensor that collects measurements of distance covered by the mobile element on the limits of the structure (axis X).

The values collected by these sensors are sent to the processing unit which consists of a computer, where they are processed for analysis of waviness noted on the measured surface.

Besides having a highly complex structure, the measurer referred to in this document of the prior art is heavy and limited by its physical restrictions, since it moves only on two axes, longitudinal axis (axis X) and vertical axis (axis Z). Hence, the accuracy of the data collected and the results obtained is low.

OBJECTIVES OF THE INVENTION

Therefore, it is an objective of this invention to provide a device for measuring deformations on surfaces that is easy to operate and enables accurate and reliable data to be obtained on three axes: longitudinal (axis X), transversal (axis Y) and vertical (axis Z).

It is also an objective of this invention to provide a device for measuring deformations on surfaces that is light, having excellent portability and low cost for use in the field.

BRIEF DESCRIPTION OF THE INVENTION

The object of the invention is a device for measuring deformations on surfaces endowed with a frame associated to fastening means of the device on the surfaces, the device further comprising at least a pair of guides associated longitudinally to an inner portion of the frame and spaced apart in parallel relation to each other, and a sliding support perpendicularly associated to the guides; the sliding support comprising a transversal groove on which there is disposed a mobile base which receives a measuring element.

BRIEF DESCRIPTION OF THE DRAWINGS

The present invention will now be described in further detail, based on an example of execution represented in the drawings.

FIG. 1 is an isometric view of the device for measuring deformations on surfaces that is the object of the present invention.

DETAILED DESCRIPTION OF THE DRAWINGS

According to a preferred embodiment and as can be seen in FIG. 1, the device for measuring deformations 10 on surfaces is endowed with a frame 11 associated to a fastening system having suction cup mounts 20 that enable the positioning and fastening of the device 10 on the surface whose deformations will be measured.

The frame 11 is formed by a pair of longitudinal portions 13, 13' parallel to each other and at whose ends transversal portions 14, 14' are perpendicularly associated, forming a rectangular and hollow inner portion 12.

At least a pair of guides 31, 32 is associated longitudinally to the inner portion 12 of the frame 11. The guides 31, 32 are spaced apart in parallel relation to each other, parallel to the longitudinal portions 13, 13' of the frame 11 and perpendicularly fastened to the transversal portions 14, 14' of the frame 11.

The device for measuring deformations 10 on surfaces further comprises a sliding support 40 perpendicularly associated to the guides 31, 32, so as to slide over these guides 31, 32. This sliding support 40 comprises a transversal groove 41, which can be through-passing or not, on which there is disposed a mobile base 42 which receives a measuring element 50.

On an upper surface 15 of at least a longitudinal portion 13' of the frame 11 there is disposed a first graduated ruler 60. The sliding support 40 comprises a second graduated ruler 70 disposed on its upper surface 43.

Also on the sliding support 40, preferably on one of its longitudinal ends, there is disposed a reading base 61, which consists of any electronic or mechanical measuring means. Accordingly, the sliding support 40 displaces linearly on a longitudinal axis (X) along the guides 31, 32 and cooperatively with a first graduated ruler 60 by way of the reading base 61, enables the reading of its displacement on X.

The mobile base 42 of the sliding support 40 displaces linearly inside the transversal groove 41 on a transversal axis (Y) and cooperatively with a second graduated ruler 70 by way of a needle 71, enables the reading of its displacement on Y.

When moving along the transversal groove 41, the mobile base 42 displaces with it the measuring element 50 which identifies deformations on the surface along a vertical axis (Z). This measuring element 50 is preferably a dial gauge, but can be a sensor or other equivalent element that can analyze the surface for imperfections such as deformations of depression, dents, folds and the like on the vertical axis (Z).

As stated previously, the frame 11 is associated with suction cup mounts 20 which enable the positioning and fastening of the device 10 on the surface whose deformations will be measured.

The fastening system is generally provided with two pairs of suction cup mounts 20, each pair of which is attached to an end of an associated support 21. Thus, the supports 21 with the suction cup mounts 20 are fastened to the transversal portions 14, 14' of the frame 11, such that they can be moved to improve the fastening of the frame 11. So that this movement of the supports 21 is possible, each support 21 is inserted into a respective slot 22 disposed on the transversal portion 14, 14' and is fastened to the frame 11 by means of a screw 23 or other equivalent attachment element.

Accordingly, to measure deformations on surfaces, particularly aerodynamic surfaces, the device for measuring deformations 10 is positioned on the surface to be measured and fastened thereon by way of the fastening means 20.

Once the device 10 is fastened, the sliding support 40 is moved along the guides 31, 32 on axis X and its displacement is measured by the reading base 61 and the first graduated ruler 60. The mobile base 42 is displaced on axis Y and its displacement is measured by the needle 71 and the second graduated ruler 70, while the measuring element 50 identifies deformations on the surface along axis Z.

The data collected during the displacements on X, Y and Z are annotated and worked so as to find out the imperfections of the surface analyzed, such as: depressions, dents, folds, among others.

The objectives of this measuring device 10 are to facilitate and standardize the measuring of deformations of depressions, dents, folds and the like, with operational practicality and portability (low weight), carrying out accurate measurements on the three axes: longitudinal axis (axis X), transversal axis (axis Y) and vertical axis (axis Z).

Having described an example of a preferred embodiment, it should be understood that the scope of the present invention encompasses other possible variations, being limited solely by the content of the accompanying claims, potential equivalents being included therein.

The invention claimed is:

1. A device for measuring surface deformations on a structural component, wherein the device comprises:
   a frame which includes opposed pairs of frame members joined to one another to define an open interior space;
   a fastening system connected to the frame for removably attaching the frame to the planar surface of the structural component such that the open interior space is positioned above and bounds a corresponding planar surface region of the structural component to be measured for surface deformations, wherein the fastening system comprises at least one opposed pair of attachment supports each having one end attached to the frame and an opposite end that extends outwardly beyond the frame, and suction cup mounts connected to the opposite end of the attachment supports for removable suction engagement with the structural component;
   at least one pair of spaced apart parallel guides positioned on an inner portion of respective frame members of the frame;
   a sliding support perpendicularly mounted to the guides so as to be reciprocally movable along an X-axis relative to the planar surface region of the structural component, the sliding support having a transverse groove therein oriented along a Y-axis perpendicular to the X-axis, and
   a mobile base which is mounted in the transverse groove for reciprocal movements therewithin along the Y-axis relative to the planar surface region; and
   a measuring element carried by the mobile base, the measuring element having a sensor for determining surface deformations in the corresponding planar surface region of the structural component occurring in a Z-axis which is mutually perpendicular to the X-axis and Y-axis thereof.

2. The device according to claim 1, wherein the opposed pairs of frame members comprise an opposed pair of longitudinal frame members and an opposed pair of transverse frame members which are perpendicularly connected to one another so as to define a rectangular inner portion establishing the open interior space.

3. The device according to claim 2, wherein each of the guides is disposed parallel to one another and parallel to a respective one of the longitudinal frame members.

4. The device according to claim 3, wherein each of the guides has opposed ends that are perpendicularly fastened to a respective one of the transverse frame members.

5. The device according to claim 2, which further comprises a first graduated ruler disposed on an upper surface of at least one of the longitudinal frame members.

6. The device according to claim 5, wherein the sliding support includes a reading base which is moveable with the sliding support in registry with the graduated ruler.

7. The device according to claim 5, wherein the sliding support comprises a second graduated ruler disposed on an upper surface thereof.

8. The device according to claim 7, wherein the mobile base includes an indicator that is moveable with the mobile base along the Y-axis in registry with the second graduated ruler disposed on the upper surface of the sliding support.

9. The device according to claim 1, wherein the measuring element comprises a dial gauge to determine surface deformations along the Z-axis.

* * * * *